US006447268B1

(12) United States Patent
Abramopaulos

(10) Patent No.: US 6,447,268 B1
(45) Date of Patent: Sep. 10, 2002

(54) POSITIVE DISPLACEMENT ENGINE WITH INTEGRATED POSITIVE DISPLACEMENT ROTARY FLUID COMPRESSOR

(76) Inventor: John Abramopaulos, 24-29 42nd St., Astoria, NY (US) 11103

( * ) Notice: Subject to any disclaimer, the term of this patent is extended or adjusted under 35 U.S.C. 154(b) by 0 days.

(21) Appl. No.: 09/724,128

(22) Filed: Nov. 28, 2000

(51) Int. Cl.[7] .................................................. F04B 17/00
(52) U.S. Cl. ......................... 417/364; 418/58; 123/52.2
(58) Field of Search ......................... 417/364; 418/58; 123/198 C, 41.47, 52.2, 52.4, 53.2, 197.4

(56) References Cited

U.S. PATENT DOCUMENTS

| 2,246,701 A | | 6/1941 | Steiner .......................... 123/495 |
| 3,101,888 A | | 8/1963 | Abramopaulos ............ 417/364 |
| 3,537,437 A | | 11/1970 | Paul et al. ................... 123/192 |
| 4,505,239 A | | 3/1985 | Deland .................. 123/197 AC |
| 4,690,113 A | | 9/1987 | Deland .................. 123/197 AC |
| 4,791,787 A | | 12/1988 | Paul et al. ................... 60/605.1 |
| 4,809,646 A | | 3/1989 | Paul et al. ................. 123/51 B |
| 4,841,928 A | | 6/1989 | Paul et al. ............. 123/193 CP |
| 4,936,262 A | | 6/1990 | Paul et al. ................. 123/25 C |
| 5,058,537 A | * | 10/1991 | Paul et al. .............. 123/51 BA |
| 5,081,961 A | | 1/1992 | Paul et al. ................. 123/51 B |
| 5,179,921 A | * | 1/1993 | Figliuzzi ................. 123/198 C |
| 5,595,147 A | | 1/1997 | Feuling ....................... 123/52.4 |
| 5,680,840 A | | 10/1997 | Mandella ................. 123/197.4 |
| 5,682,844 A | * | 11/1997 | Wittner ....................... 123/52.4 |
| 5,758,610 A | * | 6/1998 | Park ........................... 123/51 A |
| 5,836,273 A | | 11/1998 | Hair .......................... 123/52.4 |
| 5,839,887 A | | 11/1998 | Duret ......................... 417/364 |
| 5,870,979 A | | 2/1999 | Wittner ....................... 123/52.4 |
| 5,873,333 A | | 2/1999 | Wittner ....................... 123/52.4 |

* cited by examiner

Primary Examiner—Charles G. Freay
Assistant Examiner—Han L Liu
(74) Attorney, Agent, or Firm—Schweitzer Cornman Gross & Bondell LLP

(57) ABSTRACT

A positive displacement engine with integrated positive displacement rotary fluid compressor has a piston chamber, a piston disposed in the piston chamber, a rotary compressor housing, the rotary compressor housing have first and second interconnected rotary compressor chambers, and first and second rotary compressor elements disposed in the first and second rotary compressor chambers, respectively. The first and second rotary compressor elements each have an elongated arm portion pivotally connected to the piston, and have a generally circular base portion eccentrically pivotally connected to first and second crankshafs. The first and second crankshafts are interconnected to rotate synchronously in opposite directions such that the rotary compressor elements rotate, eccentrically about the crankshafts, within the rotary compressor chambers, synchronously in opposite directions. An exhaust valve is disposed in a side wall of the rotary compressor housing and is located between the first and second compressor elements to release fluid compressed between the first and second compressor elements from the compressor housing. Linear oscillation of the piston produces synchronous, balanced opposite rotation of the compressor elements within the compressor housing, which compressor elements compress fluid therebetween that is directed out of the exhaust valve. The compressed fluid can be directed to the performance of work and/or scavenging and supercharging the piston chamber prior to the performance of work.

10 Claims, 4 Drawing Sheets

POSITIVE DISPLACEMENT ENGINE WITH INTEGRATED POSITIVE DISPLACEMENT ROTARY FLUID COMPRESSOR

FIELD OF THE INVENTION

The invention pertains to positive displacement engines, and in particular, to positive displacement engines having an integrated or interconnected rotary fluid compressor.

BACKGROUND AND SUMMARY OF THE INVENTION

The inventor's prior U.S. Pat. No. 3,101,888 discloses a combined positive displacement engine and positive displacement rotary compressor apparatus having a straight-sided piston within a combustion chamber having a rectangular cross-section. A single rotary compressor element is eccentrically pivotally mounted on a crankshaft within a substantially circular compressor housing. The compressor element is pivotally connected to the piston whereby oscillation of the piston induces rotation of the compressor element about the cankshaft which compresses air in the compressor housing. The compressed air is expelled through a valve and can be directed to perform work.

The present invention provides improvements in the design of combined positive displacement engines and rotary compressors. The engine of the present invention includes a straight-sided piston disposed within a piston chamber having a rectangular cross-section, and two opposed compressor elements which are eccentrically pivotally mounted on separate, but interconnected crankshafts within a substantially figure-8-shaped compressor chamber housing. Each compressor element is pivotally mounted to the piston whereby oscillation of the piston induces synchronized counter rotation of the compressor elements about their respective crankshafts.

During compression of fluid by the compressor elements, the compressor elements rotate on their respective crankshafts toward one another compressing fluid (e.g., air) therebetween. At a point of minimum clearance between the compressor elements, fluid between the compressor elements is compressed to a maximum pressure and is expelled through an exhaust valve disposed in the compressor housing adjacent the area in which the compressor elements meet. The fluid can be directed into the piston chamber to scavenge exhaust gases from the combustion chamber and to supercharge the chamber. Further, the fluid can, before or after passing through the piston chamber, be directed to the performance of work.

The engine preferably includes two separate compressors (with a total of four compressor elements), linked to separate pistons, which pistons can share a common piston chamber. The crankshafts of each compressor are interconnected and timed causing the pistons to oscillate in opposite directions, synchronously. The dynamic forces of the engine are balanced by the opposing compressor elements of each compressor, by the opposing pistons and compressors, and by counterweights mounted on the crankshafts.

The engine of the present invention is light-weight, efficient, simple to manufacture, and suitable for many uses where fluid power is desired, particularly in aerospace, automotive and construction industries. The invention is particularly suitable for automotive and aerospace applications because the engine provides quick throttle response, whereby power is quickly and readily available.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE INVENTION

Figure 1:
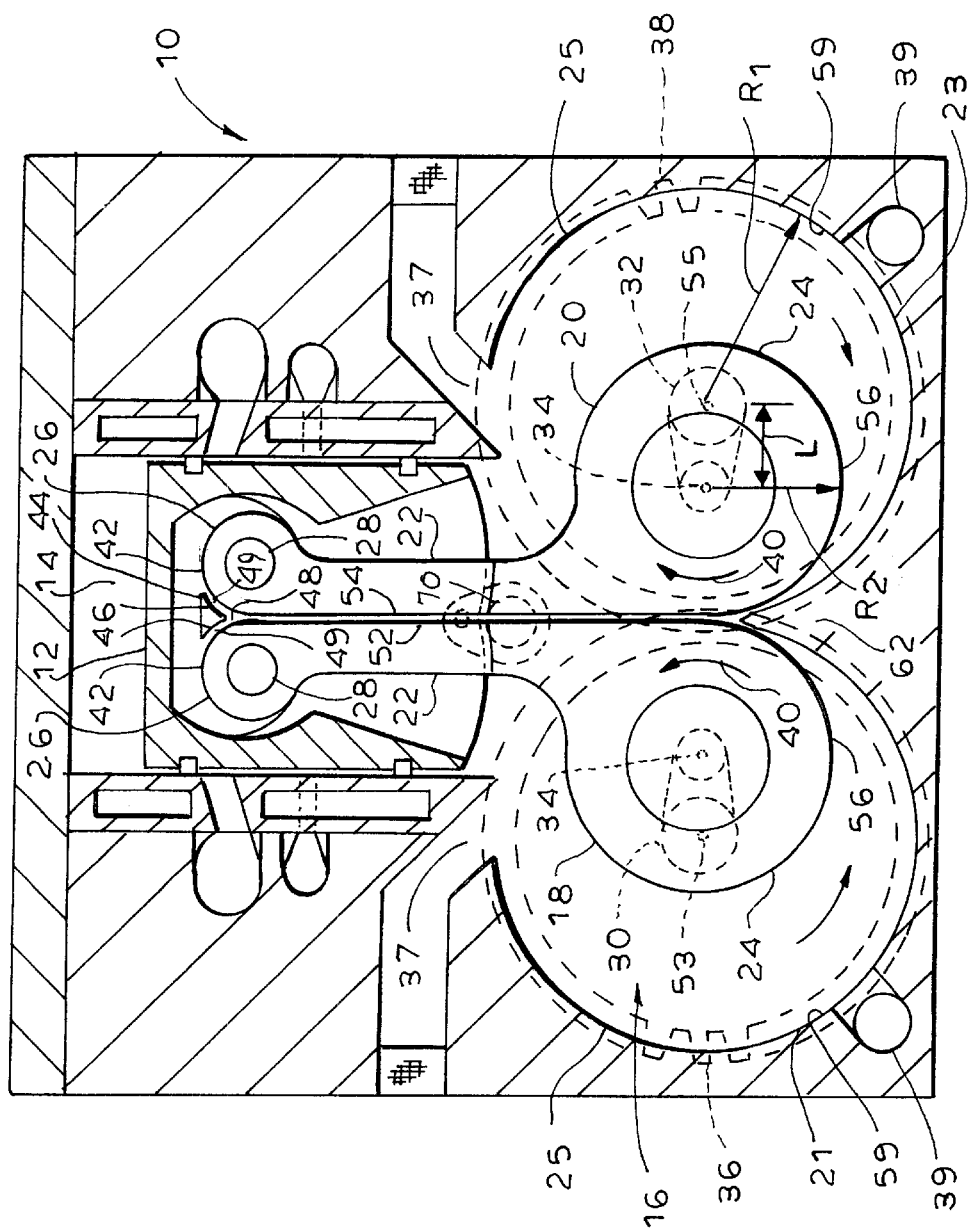
FIG. 1 is an enlarged top plan schematic view of a first embodiment of the invention, which is shown in a position of maximum compression.
Figure 2:
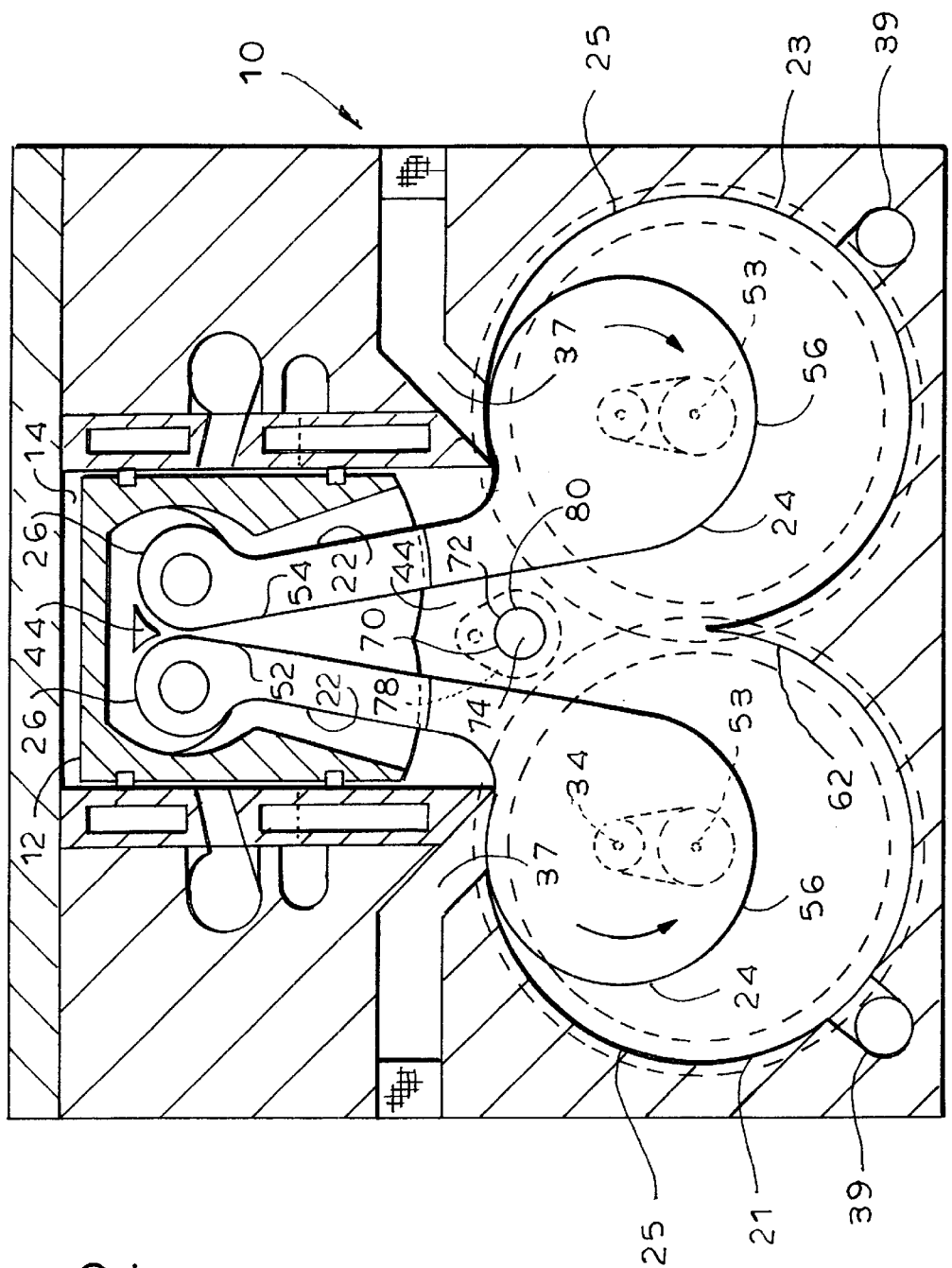
FIG. 2 is an enlarged top plan schematic view of the engine of FIG. 1, which is shown in a position intermediate maximum compression and compression.

Referring to FIGS. 1 and 2, the engine 10 of the present invention includes a linearly oscillating, flat-sided piston 12 disposed within a flat-sided piston chamber 14 having a rectangular cross-section, and a rotary compressor 16 comprising two opposed flat-sided compressor elements 18, 20 pivotally connected to the piston 12 and eccentrically pivotally mounted on separate, interconnected crankshafts 30, 32 Linear oscillation of the piston 12 (caused, for example, by the combustion of fuel in the piston chamber) induces opposite, synchronous rotation of the compressor elements 18, 20 about the axes 53,55 of the crankshafts 30, 32, compressing fluid (e.g., air) therebetween.

The compressor elements 18, 20 are partially enclosed within a substantially figure-8shaped, flat-sided compressor housing 25 having two chambers 21, 23 which communicate with the piston chamber 14. The compressor housing 25 and the piston 12 form a substantially enclosed volume (except for certain fluid inlets and outlets). The compressor elements 18, 20 include elongated, flat-sided arm portions 22, the end portions 26 of which are pivotally connected to the piston 12 by pivot pins 28. The arm portions 22 extend out of the piston 12 (and out of the piston chamber 14) into the compressor housing 25 and are preferably integrally connected to generally circular, flat-sided base portions 24 of the compressor elements 18, 20. The base portions 24 of the compressor elements 18, 20 are eccentrically pivotally mounted on separate crankshafts 30,32 by pivots 34. Each crankshaft 30, 32 is located in the center of one half of the compressor housing 25.

The separate crankshafts 30, 32 are interconnected by timing gears 36, 38 mounted thereto which ensure that the crankshafts 30, 32 and the compressor elements 18, 20 connected thereto synchronously rotate in opposite directions as shown by arrows 40. In FIG. 1, the base portion 24 of compressor element 18 rotates counterclockwise about crankshaft 30 in regular use, and the basic portion 24 of compressor element 20 rotates clockwise.

In a pre-compression position of the compressor elements (FIG. 2), intermediate a position of maximum compression (FIG. 1) and a compression position, each base portion elements 24 passes an air inlet 37 thereby creating an enclosed volume within the compression housing 25. Preferably, during pre-compression, fluid can be released from chambers 21, 23 via one or more release valves 39. After the base portions 24 traverse the release valves 39, the fluid between the compressor elements 18, 20 is compressed in the volume defined by the base 24 and arm portions 22 of the compressor elements 18, 20 and the compressor housing 25. The release valves 39 can be adjusted as desired to modify power output of the compressor.

At the position of maximum compression (FIG. 1), there is a minimal or negligible volume between the compressor elements 18, 20, thus fluid is compressed to a pressure for maximum efficiency and is expelled through an exhaust valve 70 (such as a reed valve) disposed in the compressor housing 25. The fluid may be directed into the piston chamber 14 to scavenge exhaust gases from and/or supercharge the chamber. Further, the fluid may, before or after passing through the combustion chamber, be directed to the performance of work.

The end portion 26 of the elongated arm portion 22 of each compressor element 18, 20 has a partially circular profile 42 having a center of curvature located at the axis of the pivot 28 between the associated elongated arm portion 22 and the piston 12. The piston 12 includes a seal support 44 located intermediate the two end portions 26. The seal support 44 has concave surfaces 46, each having a center of curvature located at the axis of the pivot 28 between the associated elongated arm portion 22 and the piston 12. The concave surfaces 46 mate with and complement the circular profile 42 of the end portions 26 of the compressor elements such that, during pivoting of the compressor elements 18, 20 about the pivot pins 28, a gap 48 between the end portions 26 of the compressor elements 18, 20, and gaps 49 between the compressor elements 18, 20 and the seal support 44, remain substantially constant. The gaps 48, 49 are preferably very small to effectively seal the end portions 26 to one another and to the seal support 44. However, preferably, sealing material 50 is disposed with the gaps 49 to enhance the seal.

Each elongated arm portion 22 of the compressor elements 18, 20 is preferably substantially linear. Opposed (inside), planar surfaces 52, 54 of the arm portions 22 extend tangentially from the circular end portion of the associated end portion 26 and are preferably flat In the position of maximum compression of the compressor (FIG. 1), the opposed surfaces 52, 54 are aligned in parallel substantially nearly abutting one another, at a close tolerance along their entire length.

Each circular base portion 24 of the compressor elements 18, 20 has a substantially circular profile 56 which tangentially joins the opposed surfaces 52, 54 of the associated elongated arm portion 22, preferably at a point of tangency substantially on a line passing through the axes 53, 55 of the crankshafts 30, 32 when the compressor is in the position of maximum compression (FIG. 1). The circular profile 56 of each base portion 24 describes an arc greater or equal to 270 degrees which extends from the point of tangency, in a direction opposite the direction of rotation of the compressor element about the axis of the crankshaft.

Each chamber 21, 23 within the compressor housing 25 has a concave inner surface 59 which cooperates with the circular profile 56 of the associated base portion 24 to create a moving seal as each associated compressor element 18, 20 rotates eccentrically, on its associated crankshaft 30, 32. A radius ($R_1$) of each chamber 21, 23 of the compressor housing 20 is substantially equal to the sum of the radius ($R_2$) of the circular profile 56 of a base portion 24 of an associated compressor element 18, 20 and an offset (L) between the axes 53, 55 of an associated crankshaft 30, 32 and the axis of the associated eccentric pivot 34. Thus, it can be appreciated that, as each compressor element 18, 20 pivots on its associated crankshaft 30, 32, the circular base portion 24 thereof remains in sealing proximity to the associated inner surface 59 of the chambers 21, 23, at a point which moves along the inner surface of the chamber in the direction of rotation of the base portion 24.

A junction between the inner surfaces 59 of each chamber 21, 23 forms an arcuate peak 62, with which the compressor elements 18, 20 sealingly contact during compression, preferably up to and including the point of maximum compression (FIG. 1).

During compression, fluid pressure is created in the volume defined by the inner surfaces 59 of the chambers 21, 23 and the compressor elements 18, 20. At a threshold pressure level, fluid is expelled through the exhaust valve 70 located in the compressor housing wall 72 adjacent the area 74 in which the compressor elements meet during maximum compression. The exhaust valve 70 includes an opening 72 which spans the area 74 in which the opposed surfaces 52, 54 of the elongated arm portions 22 meet during maximum compression.

As best seen in FIG. 2, the arm portions 22 and the opening of the exhaust valve 70 are sized and shaped such that in the position of maximum compression the arm portions 22 cover outside portions 78, 80 of the opening of the exhaust valve 70 thereby preventing back-flow of fluid into the chambers 21, 23.

Figure 3:
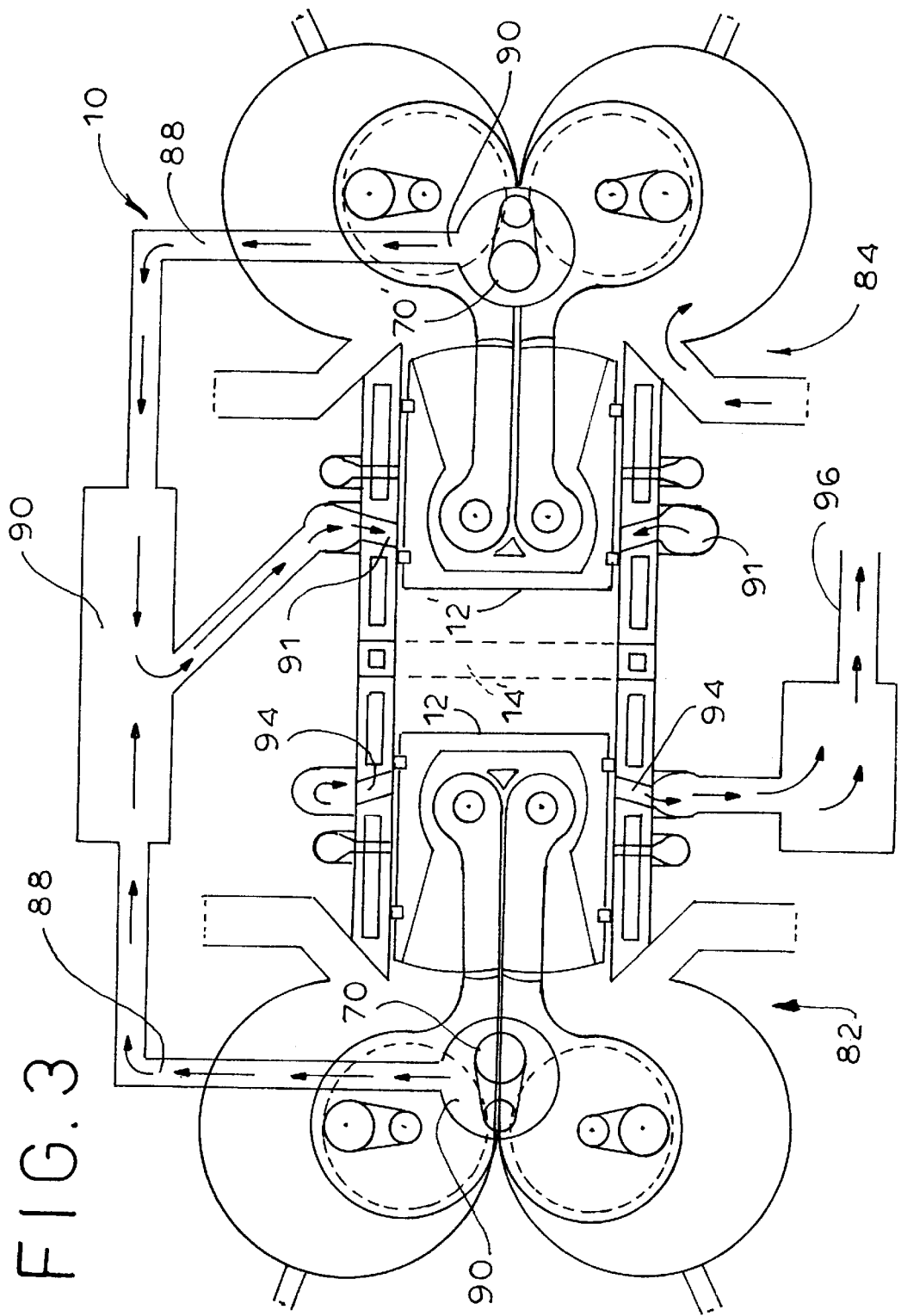
FIG. 3 is an enlarged top plan schematic view of a second embodiment of the invention.
Figure 4:
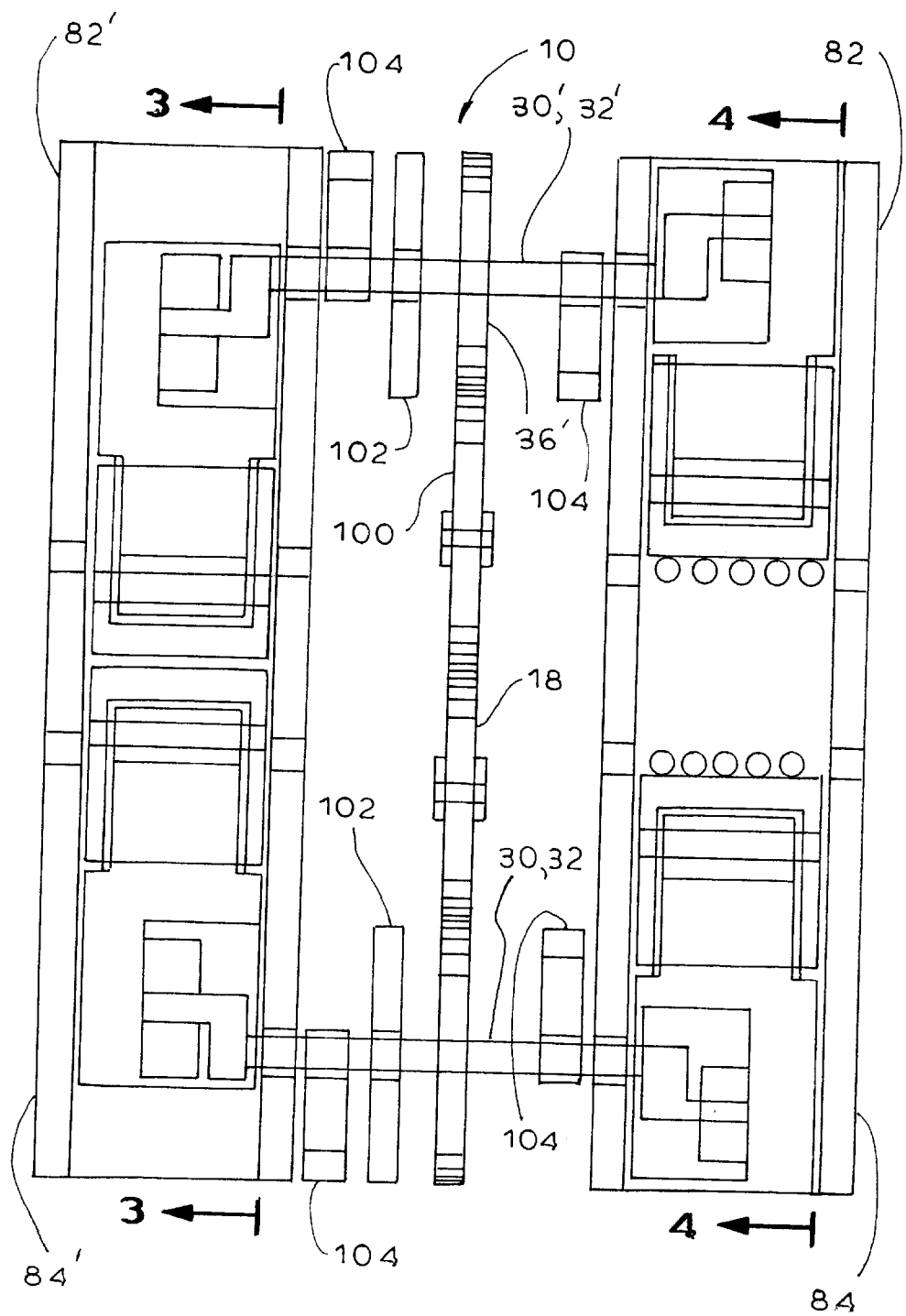
FIG. 4 is a side elevational schematic view of the engine of FIG. 3.

Referring to FIGS. 3 and 4, the engine 10 in a second embodiment has two opposed piston-compressor mechanisms 82, 84 which can share a common piston chamber 14'. The pistons 12, 12' oscillate linearly within the chamber in opposition to one another, thus balancing dynamic forces created by each mechanism.

Compressed fluid ported through the exhaust vales 70, 70' may be directed to the immediate performance of work, or may be directed into the piston chamber 14' through inlet ports 91 to scavenge exhaust gases from the chamber 14 and to supercharge the chamber 14'. Suitable ducting 88 and collectors 90 may be utilized to route the compressed fluid from the exhaust valves 70, 70' to the piston chamber 14'. Pressurized exhaust gases may be ported through an outlet port 94 and directed to the performance of work through suitable ducting 96.

The inlet and outlet ports 91, 94 are each located in positions which are sealed by the associated piston 12, 12' when the piston is within a predetermined distance of the "top-dead-center" (TDC) position. When the pistons 12, 12' pass beyond the predetermined distance from TDC, (during the expansion stroke of the piston) inlet and outlet ports 91, 94 are exposed (i.e., opened) to allow the escape and scavenging of exhaust gases. Preferably, the outlet ports 94 are opened just prior to the inlet ports 91, as is known in internal combustion technology.

Also, the output from the exhaust valve 70 of each compressor may be ported to the inlet valve 91, so the piston chamber 14 is pressurized to a superatmospheric level.

Referring to FIG. 4, the engine in the second embodiment comprises two sets of piston-compressor mechanisms 82, 82' and 84, 84' which share common cranksafts 30, 30' and 32, 32'. Timing gears 36, 36' from two of the crankshafts 30, 30' are interconnected by a pair of idler gears 98, 100 to provide synchronization between each piston-compressor mechanism 82, 82' and 84, 84'.

A flywheel 102 is attached to each crankshaft 30, 30' and 32, 32' and counterweights 104 are attached to each crankshaft 30, 30' and 32, 32' to balance the dynamic forces created by the eccentrically rotating compressor elements. Side-thrust of the piston is avoided by the counteracting forces of the dual compressor elements 18, 20. Thus, the engine 10 operates with minimal internal friction which provides enhanced efficiency and performance and which reduces engine emissions.

The positive displacement engine of the present invention provides a self-contained, highly efficient combination engine and fluid compressor that is light weight, simple in construction, and convenient in operation, the engine provides a pre-determined volume of fluid at a pre-determined pressure that can be utilized for the performance of work and provides quick. throttle response. The engine is particularly suitable for use in the aerospace industry to drive a jet-driven lifting rotor for a helicopter, thus eliminating the anti-torque rotor and the entire rotor head mechanism. Further, due in part to its quick throttle response, the engine is suitable for use in the automotive industry to drive a wheel motor in a highly efficient manner. For industrial uses, the engine is suitable to operate air-driven devices such as jackhammers, tamping tools, pumps, and other machinery. Other applications of the engine are also contemplated.

It should be understood, of course, the specific form of the invention herein illustrated and described is intended to be representative only, as certain changes may be made therein without departing form the clear teachings of the disclosure. Accordingly, reference should be made to the following appended claims in determining the full scope of the invention.

What is claimed:

1. A positive displacement engine with integrated positive displacement rotary fluid compressor, comprising:
    a piston chamber;
    a piston disposed in said piston chamber;
    a rotary compressor housing, said rotary compressor housing having first and second interconnected rotary compressor chambers;
    first and second rotary compressor elements disposed in said first and second rotary compressor chambers, respectively;
    said first and second rotary compressor elements each having an elongated arm portion pivotally connected to said piston, and having a generally circular base portion, said base portions of said first and second rotary compressor elements being eccentrically pivotally connected to first and second crankshafts, respectively;
    said first and second crankshafts being interconnected to rotate synchronously in opposite directions such that said rotary compressor elements rotate synchronously in opposite directions eccentrically on said crankshafts within said rotary compressor chambers; and
    an exhaust valve in a side wall of said rotary compressor housing for releasing fluid compressed between said first and second compressor elements from said compressor housing.

2. The positive displacement engine of claim 1, further comprising a seal between said arms and said piston.

3. The positive displacement engine of claim 2, wherein each of said elongated arm portions of said compressor elements has an end portion with a partially circular profile having a center of curvature located at a pivot point between the associated compressor element and said piston;
    said piston has a seal support having first and second concave surfaces, each concave surface having a center of curvature located at a pivot point between the associated compressor element and said piston, said concave surfaces mating with and complementing said partially circular surfaces of said elongated arm portions of said first and second compressor elements;
    a seal between each of said end portions of said elongated arm portions and said seal support.

4. The positive displacement engine of claim 1, wherein each elongated arm portion includes a substantially planar inside surface which extends substantially tangentially from said circular profile of said end portion thereof;
    said generally circular base portion of each compressor element includes a circular profile aligned substantially tangential to said inside surface of said elongated arm portion; and
    said circular profile has a center of curvature located at an axis of said eccentric pivotal connection between an associated compressor element and crankshaft.

5. The positive displacement engine of claim 4, wherein, when said compressor elements are in said position of maximum compression:
    said circular profile of each base portion tangentially joins a planar surface of an associated elongated arm portion at a line passing through axes of rotation of both said first and second crankshafts; and
    said circular profile of each end portion tangentially joins a planar surface of an associated elongated arm portion at a line passing through axes of pivot between said first and second elongated arm portions and said piston.

6. The positive displacement engine of claim 5, wherein said circular profile of said base portion of each said compressor element describes an arc of greater than about 270 degrees.

7. The positive displacement engine of claim 5, wherein each rotary compressor chamber has a substantially circular inside surface having a center of curvature located at an axis of rotation of an associated crankshaft, said circular profile of said base portion of an associated rotary compressor element being in sealing contact with an inside surface of an associated rotary compressor chamber during fluid compression;
    said circular inside surfaces of said rotary compressor chambers meeting substantially tangentially forming an arcuate peak in said compressor housing therebetween; and
    said compressor elements being in sealing contact with said arcuate peak in said compressor housing immediately preceding and in said position of maximum compression.

8. The positive displacement engine of claim 7, wherein when said compressor elements are in said position of maximum compression, said planar surfaces of said elongated arm portions thereof abut one another along substantially their entire length.

9. The positive displacement engine of claim 1, wherein:
    said engine includes two complementary piston-rotary compressor mechanisms, each having a piston;
    said pistons being disposed in a common piston chamber; and
    crankshafts of said complementary piston-rotary compressor mechanisms are interconnected.

10. The positive displacement engine of claim 1, wherein said exhaust valve is in fluid communication with said piston chamber.

* * * * *